United States Patent [19]

Sakamoto et al.

[11] Patent Number: 5,373,820
[45] Date of Patent: Dec. 20, 1994

[54] CYLINDER FUEL INJECTION TYPE TWO-CYCLE ENGINE

[75] Inventors: Osamu Sakamoto; Chitoshi Saito, both of Hamamatsu, Japan

[73] Assignee: Sanshin Kogyo Kabushiki Kaisha, Hamamatsu, Japan

[21] Appl. No.: 38,799

[22] Filed: Mar. 29, 1993

[30] Foreign Application Priority Data

Apr. 9, 1992 [JP] Japan .................. 4-116890

[51] Int. Cl.⁵ .................................. F02B 17/00
[52] U.S. Cl. ............................ 123/295; 123/73 C; 123/298; 123/305
[58] Field of Search .............. 123/73 C, 257, 276, 123/279, 295, 298, 305

[56] References Cited

U.S. PATENT DOCUMENTS

| | | | |
|---|---|---|---|
| 4,401,071 | 8/1983 | Zurner et al. | 123/276 |
| 4,492,193 | 1/1985 | Neitz | 123/276 |
| 4,770,138 | 9/1988 | Onishi | 123/276 |
| 4,920,937 | 5/1990 | Sasaki et al. | 123/305 |

Primary Examiner—Tony M. Argenbright
Attorney, Agent, or Firm—Knobbe, Martens, Olson & Bear

[57] ABSTRACT

Embodiments of two-cycle crankcase compression direct injected internal combustion engines that permit good firing and effective stratification, particularly at low speed, low load conditions. The engine defines a combustion chamber having a recess with a projection extending into the center of the recess and against which fuel is injected by a fuel injector as the piston approaches top dead center at idle. The spark plug firing is initiated prior to completion of the fuel injection. A specific configuration and orientation for the fuel injector nozzle in relation to the projection size and cylinder bore size is established so as to insure that at least 50% of the fuel injected at low and idle speed conditions will impinge upon the projection.

25 Claims, 9 Drawing Sheets

CYLINDER FUEL INJECTION TYPE TWO-CYCLE ENGINE

BACKGROUND OF THE INVENTION

This invention relates to a direct fuel injection system for an internal combustion engine.

The advantages of direct cylinder injection are well known. Basically, by employing direct cylinder fuel injection with an internal combustion engine it is possible to obtain increases in fuel economy and exhaust emission control. The reason for this is that it is substantially easier to obtain fuel stratification with direct injection systems and fuel stratification can achieve the aforenoted results. However, one difficulty with providing for fuel stratification in the combustion chamber is that it must be ensured that the stoichiometric fuel patch is at the spark gap at the time it is fired. This is a considerable problem, particularly at low speeds and low loads.

With one type of direct cylinder fuel injection which has been employed, the fuel is injected at a relatively low pressure (approximately ten times atmospheric pressure). Because of this low pressure of fuel injection, the fuel must be injected relatively early in the induction cycle so as to avoid the problems of injecting the fuel once the mixture becomes compressed in the combustion chamber. Once compression takes place, the pressure difference between the low pressure fuel injector and the area where it injects is not enough to permit sufficient fuel flow.

Another problem with direct cylinder injection employing such low pressures is that the size of the injection nozzle must be relatively large so as to insure adequate fuel is injected during the period when injection takes place. If large enough diameters are employed to accommodate the high speed, high load conditions of the engine, then the injector nozzle size is so large that at low speed, low loads, the fuel particles become quite large and complete atomization of the fuel is not possible.

It is, therefore, a principal object of this invention to provide an improved arrangement for injecting fuel directly into the cylinder of an engine wherein adequate amounts of fuel can be injected under all conditions and good vaporization will result.

A form of combustion chamber has been proposed that will improve fuel stratification and in which a recess or bowl is formed in the head of the piston and a projection extends into this recess. The concept of employing a projection into the recess is that the fuel is desired to be sprayed in proximity to this projection and this will ensure vaporization of the fuel. However, with this type of arrangement it is difficult to ensure that the vaporized fuel will be around the gap of the spark plug at the time it is fired. The reason for this is that, as already noted, it is normally the practice to spray the fuel into the cylinder at a time well before top dead center and the fuel charge can easily be dispersed out of the recess into the remainder of the combustion chamber to form a mixture that is too lean for firing or, alternatively, not juxtaposed to the spark gap at the time the spark plug is fired. With the previously proposed type of arrangement it has been necessary to delay the start of firing of the spark plug in relation to the total time of fuel injection from the fuel injection valve. This is done so as to permit the fuel evaporated from the projection to reach the spark plug at the time when the spark plug is fired. This system has been utilized with four cycle engines.

However, the application of this type of principle to a two cycle engine gives rise to problems which cannot be solved with the type of arrangement applied to four cycle engines. In a two cycle engine, the temperature within the combustion chamber after compression is higher and the temperature of the head of the piston is also higher. Thus, fuel that is injected evaporates faster than with a four cycle engine and the kinetic energy created by its evaporation and expansion rapidly dissipates. Because of this, the mixture which has been sprayed against the projection in the combustion chamber can readily dissipate before it reaches the spark plug and also the loss of kinetic energy can result in incomplete combustion. In addition, two cycle engines require good scavenging and the scavenging action can disturb the fuel stratification.

Because of the aforenoted situations, it is extremely important when applying direct cylinder injection to a two cycle engine that employs a projection on the head of the piston to improve stratification to place the spark plug gap as close as possible to the piston projection. An arrangement has been disclosed in the commonly-assigned application for United States Letters Patent entitled "Cylinder Fuel Injection Type Two-Cycle Internal Combustion Engine", Ser. No. 08/012,311, filed Feb. 2, 1993, in the names of the inventors of this application and also of Seiichi Nishimura and in its parent application of the same title, Ser. No. 07/830,670, filed Feb. 3, 1992, now abandoned, to provide a system and method for injecting fuel into the engine against the projection so that the better combustion can occur and also that stratification may be achieved at low speed, low load conditions.

In addition, with this type of combustion chamber it is also extremely desirable to insure that a large percentage of the fuel injected, particularly at low speed, low load conditions, will actually impinge upon the projection. Thus, in addition to the problems of proper fuel capacity and particle size, with this type of combustion chamber it is also important to insure that the injector nozzle is configured so that a large portion of the injected fuel will be sprayed onto the projection at low speed, low load conditions.

It is, therefore, a further principal object of this invention to provide an improved direct cylinder injection system for an internal combustion engine that achieves fuel stratification and ensures firing, even under low load, low speed conditions.

It is a further object of this invention to provide an improved fuel injector nozzle arrangement for the type of engine having a combustion chamber with a projection onto which the nozzle sprays and which will insure that maximum amounts of fuel particles at the right size will be sprayed onto the projection, particularly at low speed, low load conditions.

SUMMARY OF THE INVENTION

This invention is adapted to be embodied in a direct injected internal combustion engine having a pair of relatively movable components that define a variable volume combustion chamber having a circular cross section. Fuel injection means are mounted in one of the components and is disposed so that fuel issuing therefrom will be directed to the combustion chamber as the components approach their minimum volume condition. A spark plug is provided with its gap disposed in the combustion chamber when the components are in their minimum volume condition. The fuel injector injects fuel into the combustion chamber as the components approach the minimum volume condition under low speed low, load conditions and the spark plug is fired. The fuel injector nozzle has a spray port diameter that is in a ratio of 0.0035 to 0.0065 of the diameter of the cross section of the combustion chamber.

DETAILED DESCRIPTION OF THE PREFERRED EMBODIMENTS OF THE INVENTION

Figure 1:
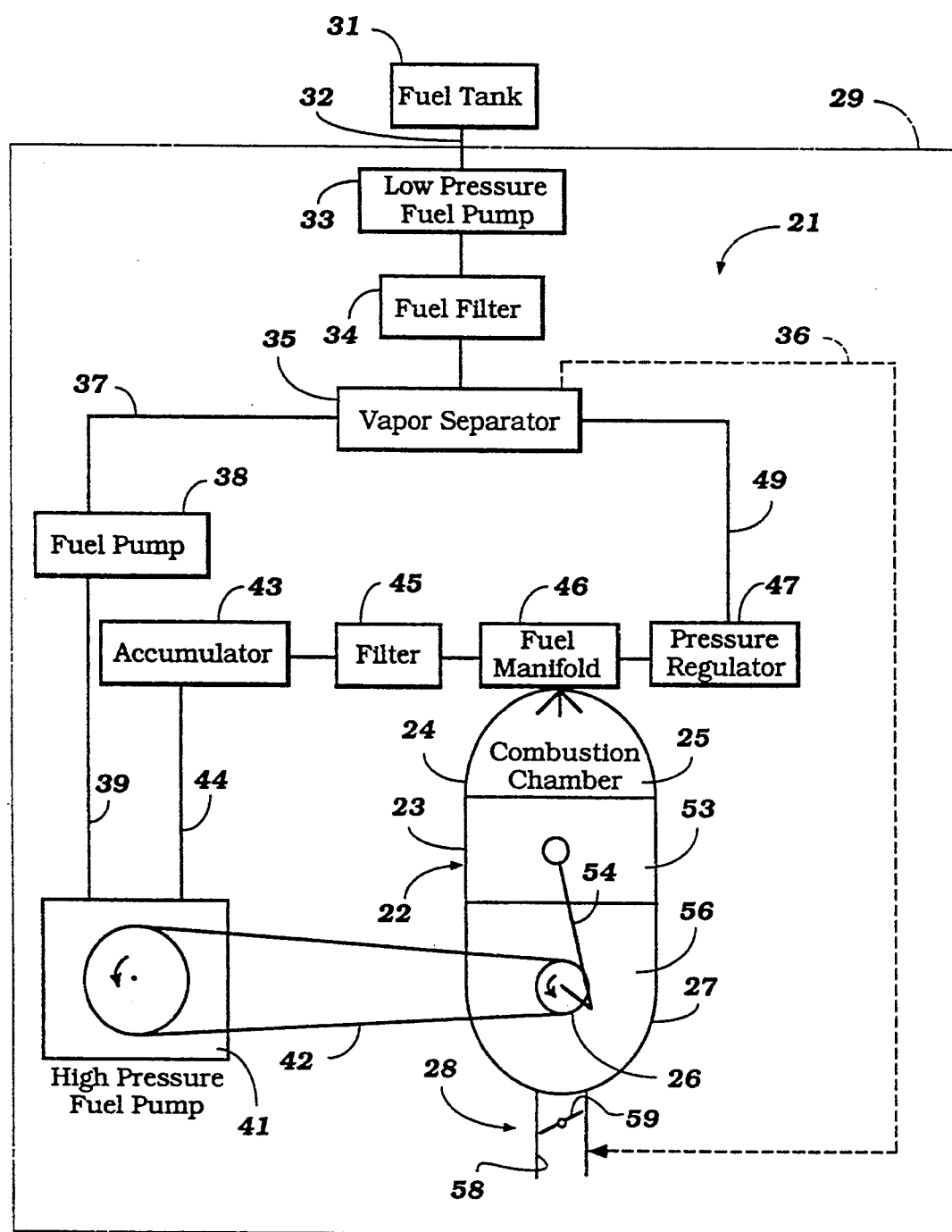
FIG. 1 is a partially schematic view of an outboard motor powered by an internal combustion engine having a fuel injection system constructed and operated in accordance with an embodiment of the invention.

Referring first to FIG. 1, an outboard motor constructed and operated in accordance with an embodiment of the invention is shown schematically and is identified generally by the reference numeral 21. Although the invention is described in conjunction with an outboard motor, it is to be understood that the invention may be employed in conjunction with other applications for internal combustion engines. However, the invention has particular utility in outboard motors since outboard motors are frequently powered by two-cycle internal combustion engines and the invention has particular utility with such engines.

The engine is shown schematically in FIG. 1 and is identified generally by the reference numeral 22. The construction of the engine is shown in more detail in the remaining figures but basically includes a cylinder block assembly 23 to which a cylinder head 24 is affixed and which defines a combustion chamber 25. The engine 22 also has a crankshaft 26 that is rotatable about an axis within a crankcase chamber formed by a crankcase member 27 and the cylinder block 23 in a well known manner. An air induction system 28 supplies air to these crankcase chambers.

The outboard motor 21 also includes a protective outer cowling which is designated by the dot-dash line 29, this being shown to indicate which components are contained within the power head of the outboard motor 21 and which components are positioned externally of it.

A fuel tank 31 is provided externally of the outboard motor 21, normally within the hull of an associated watercraft, and supplies fuel through a conduit 32 to a low pressure fuel pump 33 which may be driven in any suitable manner. The low pressure fuel pump 33 then supplies fuel through a fuel filter 34 to a vapor separator 35. The vapor separator separates fuel vapor from the fuel flowing and delivers the vapor to the induction system 28 as represented by the dotted line 36.

Fuel from the separator 35 is delivered through a conduit 37 to a further fuel pump 38 which also is driven in any suitable manner. The fuel pump 38, in turn, delivers fuel through a conduit 39 to a high pressure fuel pump 41 which is driven from the crankshaft 26 in a suitable manner, such as through a timing belt or chain 42. The high pressure fuel pump 41 charges an accumulator 43 through a conduit 44 and the fuel from the accumulator 43 flows through a filter 45 to a fuel manifold 46 which supplies the individual fuel injectors. A pressure regulator 47 communicates with the manifold 46 through a conduit 48 so as to maintain a uniform fuel pressure for the injectors (50 to 150 atm). The regulator 47 regulates pressure by dumping excess fuel back to the vapor separator 35 through a return conduit 49.

The foregoing description is made primarily for orientation but it is to be noted that all elements of the system, except for the fuel tank 31, are disposed within the protective cowling 29 of the outboard motor 21 so as to minimize the number of external conduits required.

The construction of the engine 22 will now be described by particular reference initially to FIGS. 2–4. It should be noted that the engine 22 is a reciprocating multi-cylinder engine operating on a two-stroke crankcase compression principle. As has been heretofore noted, however, the invention may be applicable to engines operating on other than the two-stroke principle and, also, the invention may be employed with non-reciprocating engines. The invention, however, has particular utility in conjunction with ported engines. Also, since it is believed that those skilled in the art can readily understand how the invention can be practiced with multiple cylinder engines, the engine 22 will be described by particular reference only to a single of its cylinders.

Figure 2:
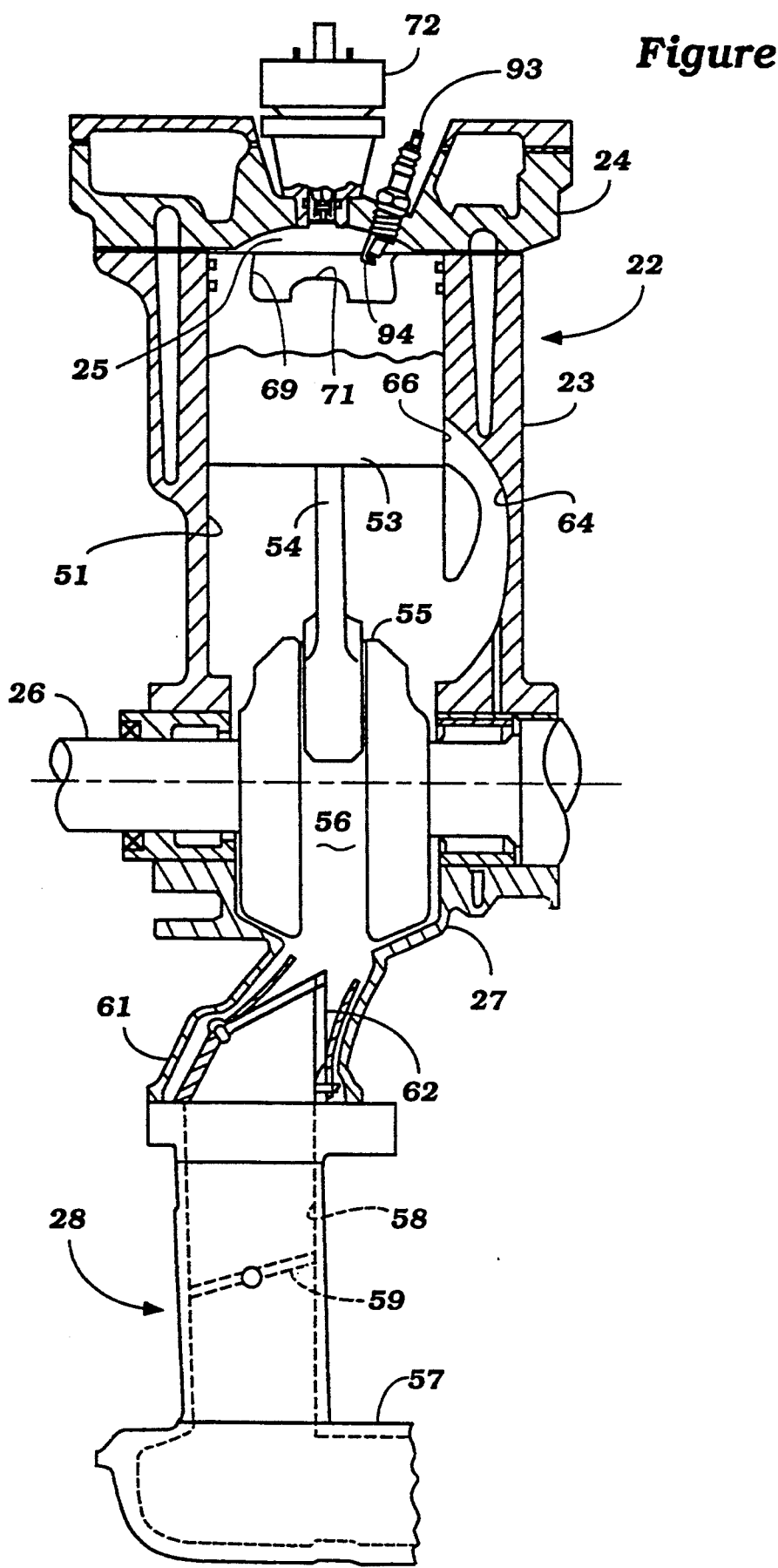
FIG. 2 is an enlarged side elevational view of the engine, partially taken in cross section through a single cylinder of the engine.
Figure 3:
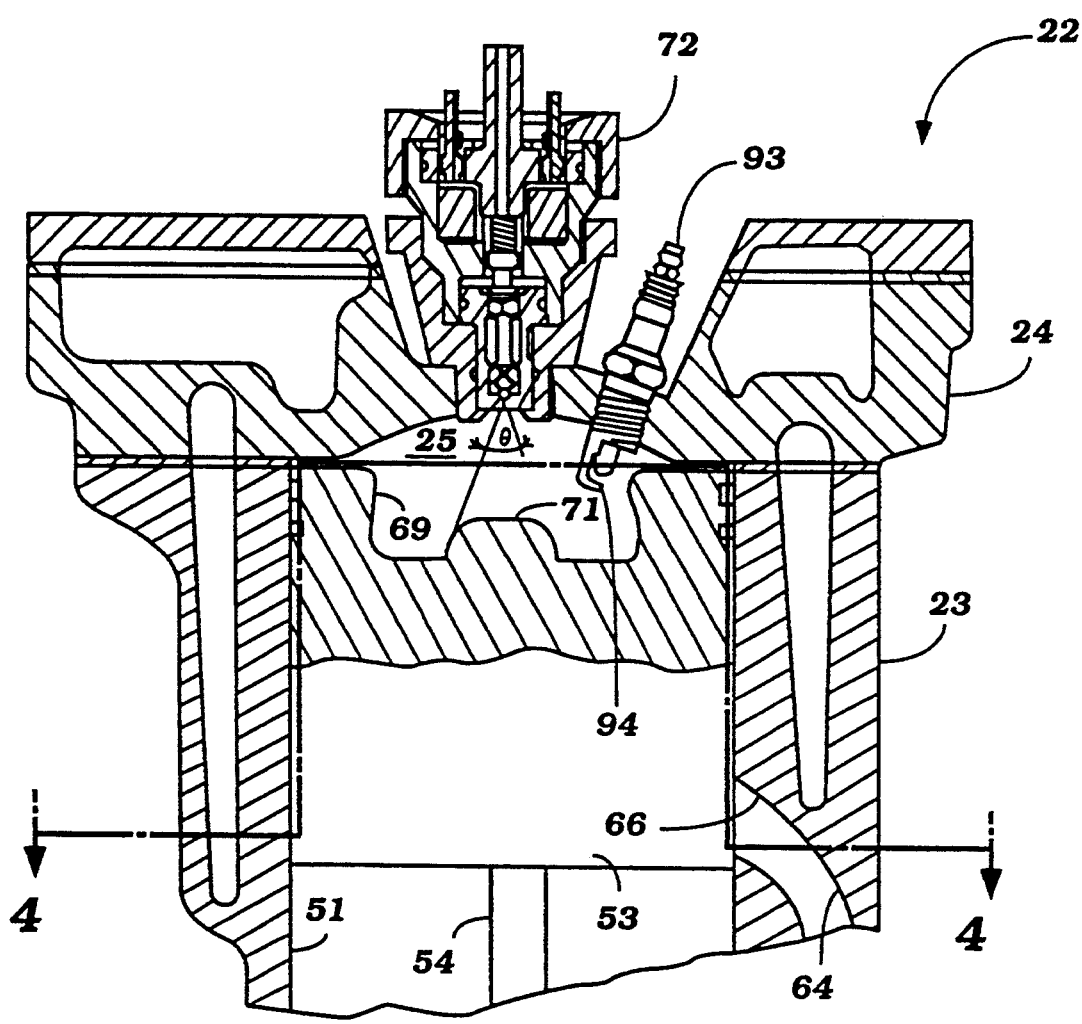
FIG. 3 is a still further enlarged cross-sectional view showing the combustion chamber and components associated with it.
Figure 4:
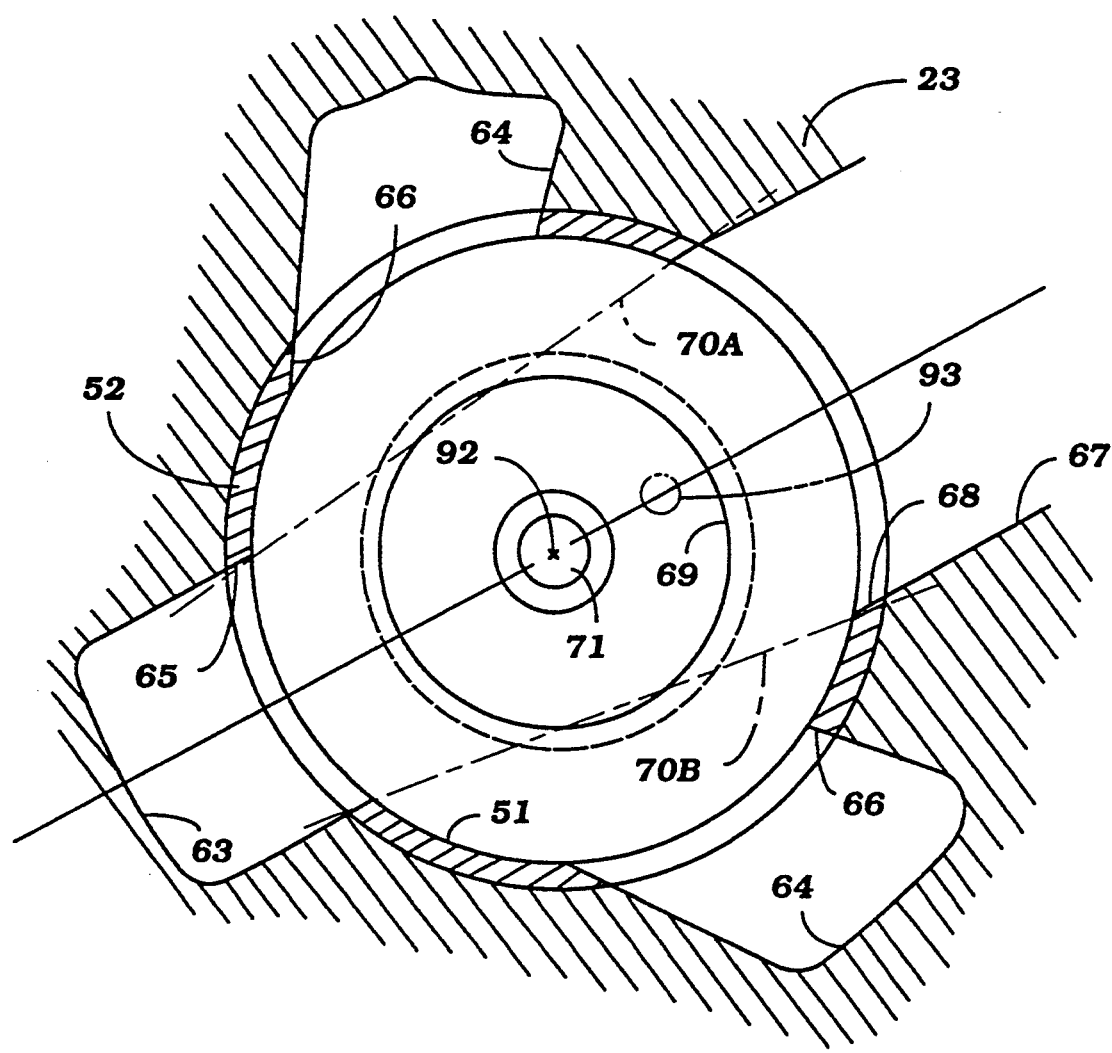
FIG. 4 is an enlarged cross-sectional view taken along the line 4—4 of FIG. 3.

The cylinder block 23 is formed with a cylinder bore 51 that is formed from a cylinder liner which does not appear in FIGS. 2 and 3, but is shown in FIG. 4 and is identified generally by the reference numeral 52. The cylinder liner 52 is not shown in FIGS. 2 and 3 so as to simplify these figures. A piston 53 reciprocates within the cylinder bore 51. The piston 53 is connected by means of a piston pin (not shown) to the upper or small end of a connecting rod 54, the lower end of which is journaled on a throw 55 of the crankshaft 26.

The crankshaft 26, as has been noted, rotates within a crankcase chamber 56 that is formed by the cylinder block 23 and crankcase member 27. As is typical with two-cycle engine practice, the individual crankcase chambers 56 associated with each of the cylinder bores 51 are sealed from each other.

The induction system 28 includes an air inlet device 57 which draws atmospheric air from within the protective cowling 29 and delivers it to a throttle body 58 in which a throttle valve 59 is positioned. The throttle valve 59 is controlled by the operator in any well known manner. The throttle body 58 delivers the air charge to the crankcase chamber 56 through a manifold 61 in which a reed-type check valve 62 is positioned. The reed-type check valve 62 permits air to flow into the crankcase chambers 56 when the piston 53 is moving upwardly but precludes reverse flow when the piston 53 moves downwardly to compress the charge delivered to the crankcase chambers 56.

The compressed charge is transferred from the crankcase chamber 56 to the area above the piston 53 upon its downward movement through a main scavenge passage 63 and a pair of circumferentially disposed side scavenge passages 64. The scavenge passages 63 and 64 terminate in respective scavenge ports 65 and 66 which are formed in the cylinder liner 52.

Diametrically opposed to the main scavenge passage 63 and between the side scavenge passages 64 is an exhaust passage 67 which communicates with the cylinder bore through an exhaust port 68 formed in the liner 52. The configuration of the ports as thus far described is designed so as to provide a Schnurle type scavenging in the cylinder. It should be noted that the side edges of the main scavenge port 63 and the side edges of the exhaust port 68 define a pair of planes 70A and 70B that extend across the combustion chamber and primarily in the area of a recess 69 formed in the head of the piston 53 for a reason which will be described later.

The piston 53, cylinder bore 51 and cylinder head 24 form a variable volume chamber referred to previously as the combustion chamber 25. This combustion chamber 25 is formed in part by the recess 69 formed in the head of the piston 53, which recess has a generally cylindrical bowl configuration with a raised projection 71 being formed at its center. The recess 69 may be somewhat reversely tapered as shown in the figures so that it is wider at its bottom than its top, and the projection 71 does not extend to the full head of the piston 53. As may be best seen in FIG. 5, the projection 71 has a diameter $D_1$. The recess 69 has a maximum diameter $D_3$ adjacent its lower edge and the piston 53 and cylinder bore 51 have a diameter $D_2$. The significance of these dimensions will be described later by reference to the fuel injector and certain of its components.

A fuel injector 72 is mounted in the cylinder head 24 so that it is aligned substantially with the axis of the cylinder bore 51 and is directed toward the projection 71. The fuel injector 71 receives fuel from the fuel manifold 46 in a manner which will be described.

Figure 5:
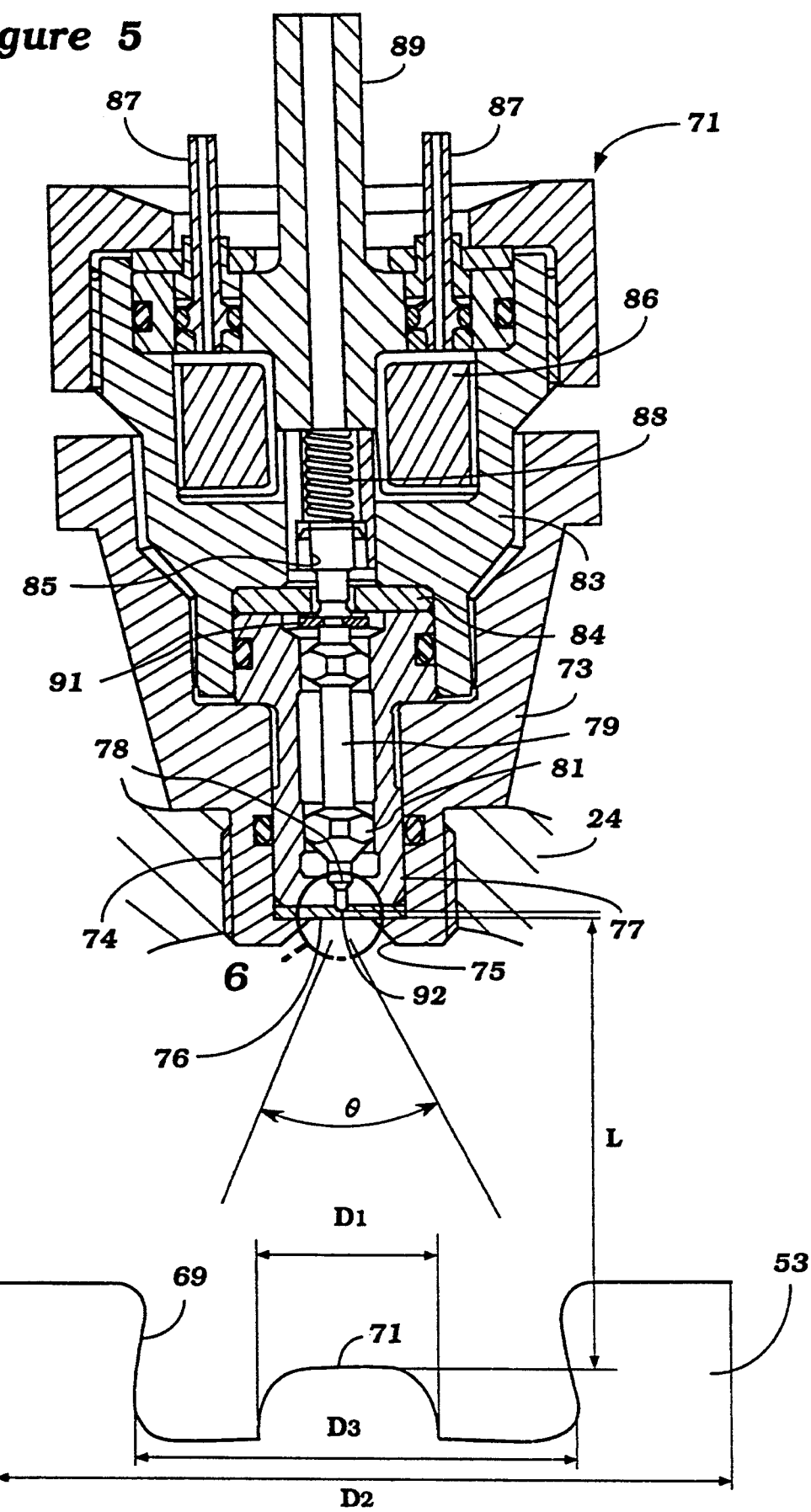
FIG. 5 is a further enlarged cross-sectional view taken along a plane parallel to the plane of FIG. 3 and shows the construction of the fuel injector and its relation to the head of the pistons.

The construction of the fuel injector 72 will be explained by particular reference to FIG. 5. The fuel injector 72 includes a lower supporting housing 73 that has external threads 74 so that it may be screwed into the cylinder head 24. The portion 73 has a conically tapered opening 75 formed in its lower end. A nozzle plate 76 is held against the support member 73 at the base of the opening 75 by means of a nozzle portion 77. The nozzle portion 77 has a nozzle port 78 that is controlled by an injection valve, indicated generally by the reference numeral 79 and which is supported within a bore 81 in the nozzle portion 77. The injection valve 79 has a series of hexagonally shaped portions 81 which slidably support the injection valve 79 but which will permit fuel to flow therepast. An upper housing member 83 is affixed to the support member 73 and holds the nozzle portion 77 in position. A plate 84 having an opening 85 is provided between the nozzle portion 77 and upper housing member 83.

The upper housing member 83 supports a solenoid winding 86 which is energized through a pair of leads that pass through insulating nipples 87 carried by the injector assembly 72. When energized, the winding 86 will draw the injector valve 79 upwardly through a magnetic action, compressing a coil compression spring 88 so as to open the nozzle port 78. Fuel is delivered to the interior of the bore 81 through a fuel inlet 89 which cooperates with the fuel manifold 46. A hexagonal stop 91 formed on the injector valve 79 will engage the plate 84 to limit the degree of opening of the injector valve 79 without interfering with the fuel flow from the nozzle port 78. As may be seen in FIG. 6, the nozzle port 78 cooperates with a smaller injector port 92 formed in the plate 76 and which is directed at an area above the projection 71 of the piston 53. The port 92 is disposed centrally of the projection 71 as shown at 92 in FIG. 4.

Figure 6:
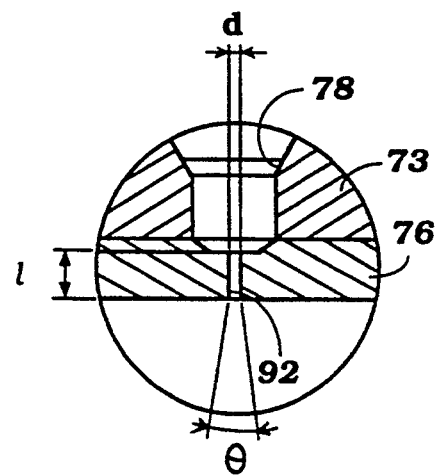
FIG. 6 is a yet further enlarged cross-sectional view of the area encompassed by the circle 6 in FIG. 5.

As may be seen in FIG. 6, the nozzle port 92 has a diameter d and extends for a length l through the plate 76. It should be noted that the nozzle port 78 does extend partially into the plate 76 so as to control the dimension l. The diameter d and length l are chosen so as to provide a spray angle $\theta$ which will insure that a large portion (at least 50%) of the fuel which is injected by the injector 72 at low speed, low load conditions will impinge upon the projection 72. This is done by maintaining the shape ratio of the injector port 92 (l/d) in the range of in the range of 3 to 4 so as to keep the shape of the injection angle $\theta$ relatively small. The ratio of the diameter d of the injection port 92 to the bore or diameter $D_2$ of the piston and cylinder bore is in the range of 0.0035 through 0.0065. This insures that maximum fuel can be injected under high load and high speed conditions and, at the same time, the fuel particle size at low speed, low load conditions will be relatively small so as to insure good fuel vaporization.

The ratio of the projection diameter $D_1$ to the recess diameter $D_3$ is set in the range of about 1 to 5 and it is set so that the distance L between the injection port 92 and the head of the projection 71 establishes the following relationship:

$$(2 \cdot L \cdot \tan(\theta/2) + d) \div D_1 \leq 2.0$$

By maintaining these relationships, it will be insured that at least 50% of the fuel injected when the piston 53 is near top dead center will impinge upon the projection 71. This insures that even a small quantity of fuel can be ignited.

The ratio of the diameter $D_2$ of the piston to the maximum diameter $D_3$ of the recess 69 ($D_2/D_3$) is set in the range of 5 to 8. Thus, the expanding diameter of the fuel particle when it reaches the projection 71 after being injected at the angle $\theta$ from the injection port is set to be approximately 1.2 to 3.5 times the diameter $D_1$ of the projection namely $(2 \cdot L \cdot \tan(\theta/2) + d) \div D_1 = 1.2$ to 3.5. Also, it is insured that $(2 \cdot L \cdot \tan(\theta/2)) \leq D_3$ because this insures stable combustion at high speed, high load conditions.

Figure 7:
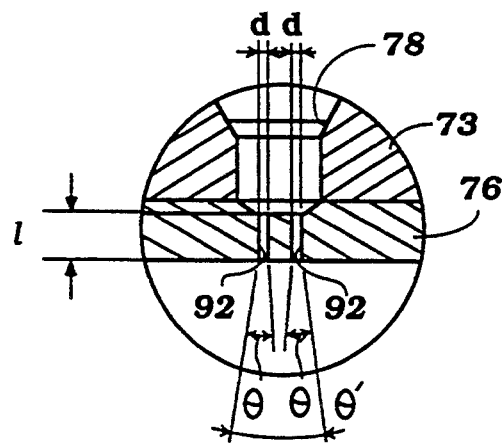
FIG. 7 is a view in part similar to FIG. 6 and shows another embodiment of the invention.
Figure 8:
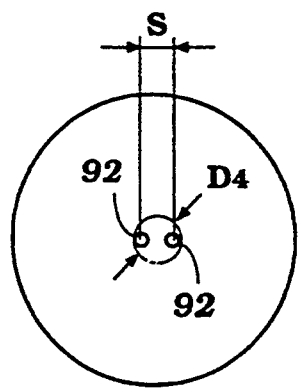
FIG. 8 is a view taken in the direction perpendicular to FIG. 7 and shows the relationship of the discharge orifices in this embodiment.

Alternatively to a single injection port 92, the plate 76 may be provided with multiple injection ports 92 as shown in FIG. 7. This will permit wider dispersion of the fuel and can also permit a greater amount of fuel flow. It may be preferred to employ a plurality of injection ports 92 rather than a single larger injection port for this purpose. When two smaller injection ports 92 rather than one larger injection port are employed as shown in this figure, the total injection angle $\theta''$ is subtended between the outer periphery of the individual spray angles $\theta$ of the nozzle ports 92. The center to center distance between the nozzle ports 92 is indicated by the dimension "s" while the maximum outer subtended diameter of the nozzle ports is indicated by the dimension $D_4$. In order to obtain optimum performance with this embodiment, $D_4$ should be $\leq D_1$ and the following relationship should exist $(2 \cdot L \cdot \tan(\theta/2) + s) \leq D_3$.

Referring again to FIGS. 2–4, a spark plug 93 is mounted in the cylinder head 24 and has its spark gap 94 extending into the piston recess 69 when the piston 53 is at its top dead center position as shown in FIGS. 2 and 3. The spark plug 93 is fired in a suitable manner, preferably by a capacitor discharge type of ignition system, for a reason which will be described.

The way in which the system operates, particularly at low speed, low load conditions when operation is most critical will now be described by particular reference to FIGS. 9–11. Basically, the system operates under low speed, low load conditions so that the injector 72 begins injecting fuel as the piston closely approaches top dead center and the spark plug 93 is fired at a time when the injector 72 is still injecting fuel and continues to fire after the fuel injection has completed. The effect of this may be understood by reference to FIG. 9–11.

Figure 9:
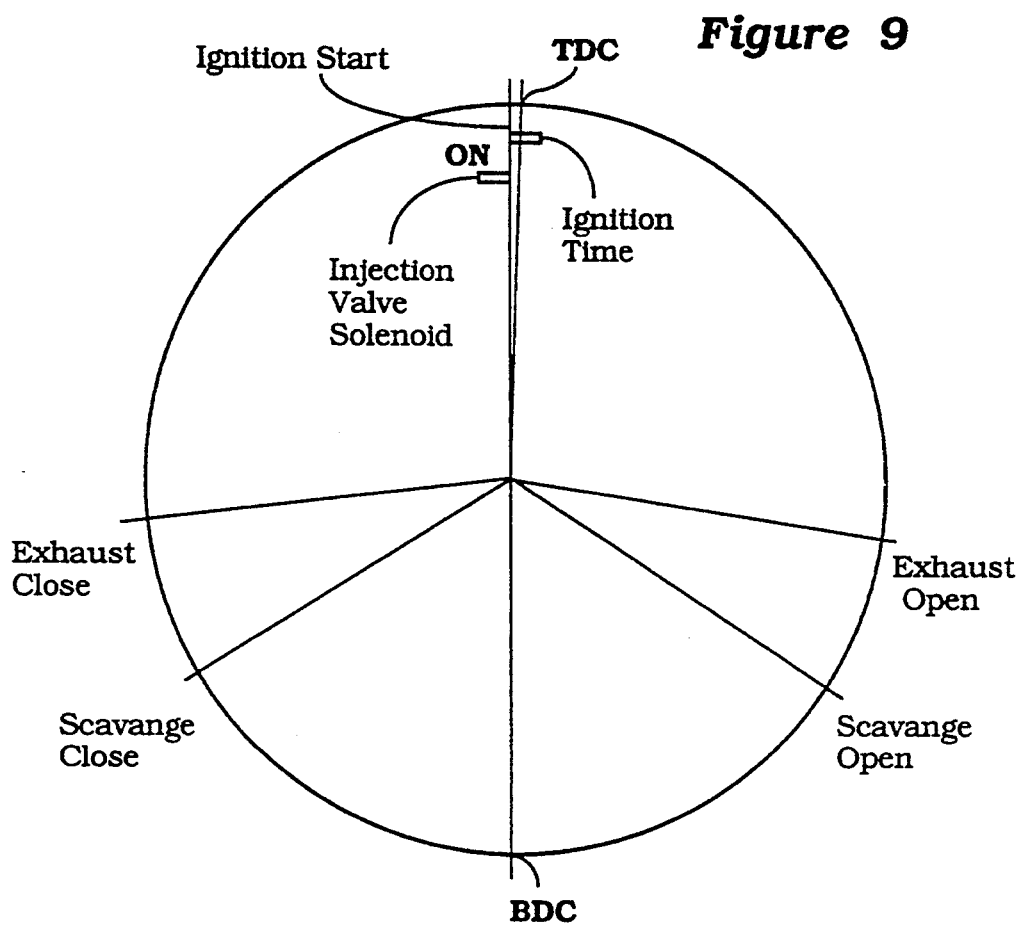
FIG. 9 is a timing diagram showing the varying events in the engine under low speed, low load conditions.

As seen in FIG. 9, the piston 53 is approaching top dead center position but still is approximately 7° before top dead center under idle. At this time, as will become apparent, the solenoid 86 will be energized but the injector valve 79 will not yet open because of the inertia in the system. As the piston 53 continues to move toward top dead center, the injector valve 79 will open and fuel will be sprayed on the projection 71 and dissipate into the piston recess 69 and particularly in the vicinity of the spark gap 94. The spark plug 93 is then fired at a time when fuel will be in proximity to it at a few degrees before top dead center. This will then cause burning of the fuel and the fuel injection is then stopped while the spark gap is still firing as shown in FIG. 9. The firing continues until approximately 6° after top dead center so as to ensure that the flame will progress gradually and yet burn completely. As the speed and load of the engine increases, the timing of fuel injection initiation is advanced and as high load, high speed conditions are reached, fuel injection is completed before the spark plug 93 is fired. This is permissible since a homogeneous mixture will substantially fill the combustion chamber under these conditions and there will be very little stratification.

Even after the scavenge passages 63 and 64 are closed, there will continue to be a flow across the combustion chamber toward the exhaust passage 67. This flow will cause the fuel that is injected by the injector to evaporate from the projection 71 and be swept toward the spark plug 93 between the aforenoted planes 70A and 70B as aforenoted. This will tend to ensure that there will be at least some of the evaporated fuel/air mixture at the spark gap 94 at the time of firing. As has been noted, the geometry and relationship of the dimensions of the injector nozzle port 92 and the configuration of the recess 69 and projection 71 will insure that even at low load, low speed conditions at least 50% of the injected fuel will impinge upon the projection 71 so as to insure complete combustion.

Figure 11:
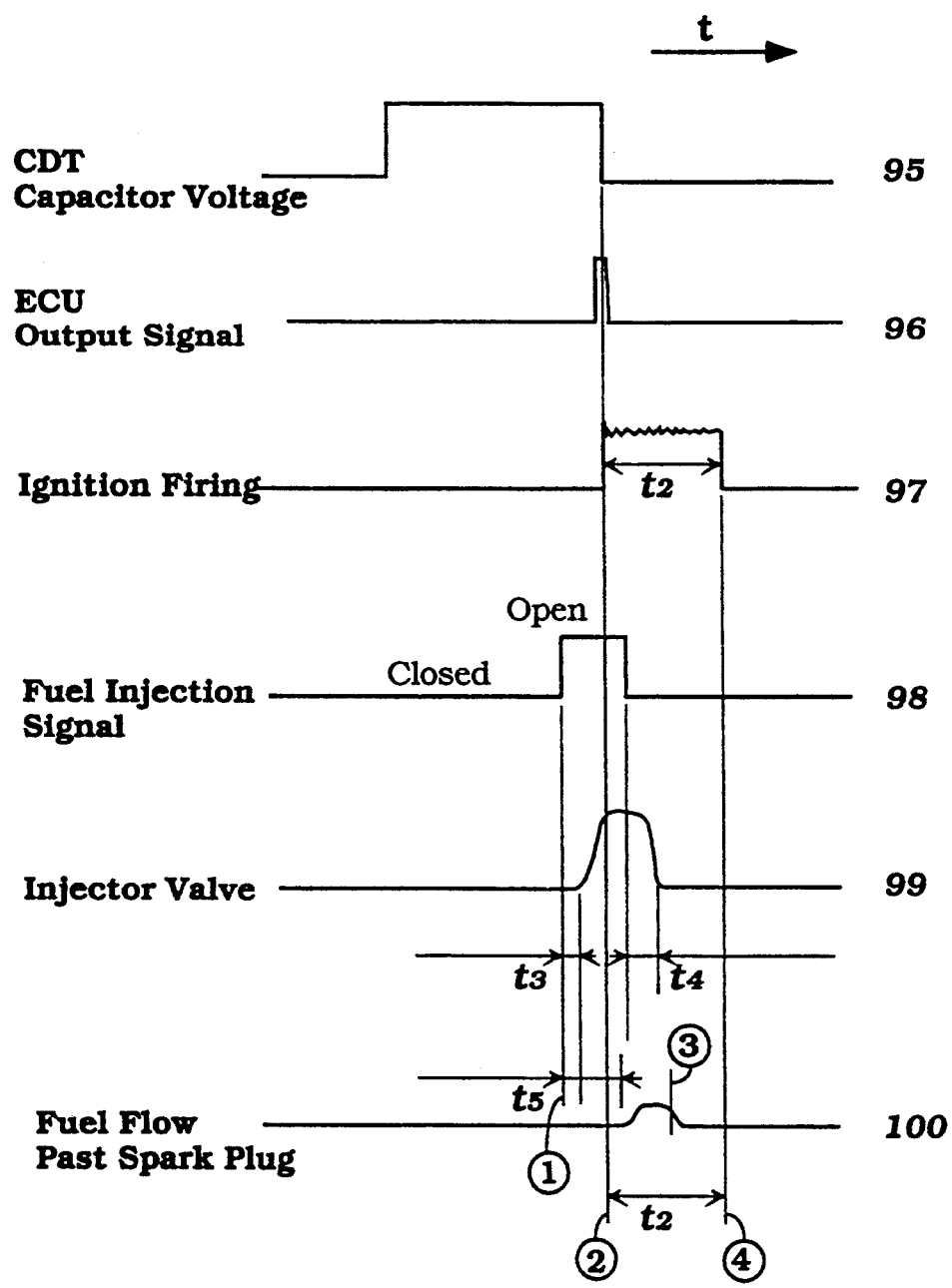
FIG. 11 is a graphical view showing the conditions associated with the spark plug timing and firing, injector valve actuation and opening and fuel flow past the spark gap under low speed, low load conditions.

Referring now specifically to FIG. 11, this show curves 95–100. As may be seen, the curve 95 represents the charging voltage of the capacitor in the ignition system. This charging is held until the spark plug is fired by an output signal from the ECU, to be described, shown by the curve 96, to initiate spark plug firing for duration of approximately 2 milliseconds ($t_2$, curve 97) at which time the plug firing is discontinued.

The curve 98 shows the energizing pulse for the solenoid 86 which begins at a time approximately 0.2 milliseconds ($t_3$) before the injector valve 79 begins to open (curve 99) while the injector valve does not move to its fully opened position until approximately 1.5 milliseconds after the beginning of the opening. The pulse signal is stopped at the point G and the injector valve closes very shortly thereafter with the time delay $t_4$.

As may be seen from the curve 100, the fuel which has been injected into the combustion chamber beginning at the time 1 when the injector valve has been opened will pass the gap of the spark plug at a time delay $t_5$. The spark plug is fired previously to this at the point in time 2 and the spark plug firing continues until it is terminated at the point 4 during which time fuel will have passed the spark gap and fired. In this particular embodiment, the timing is such that all of the fuel flow that flows past the spark plug will pass during the time period $t_2$ when the spark plug is fired.

Figure 10:
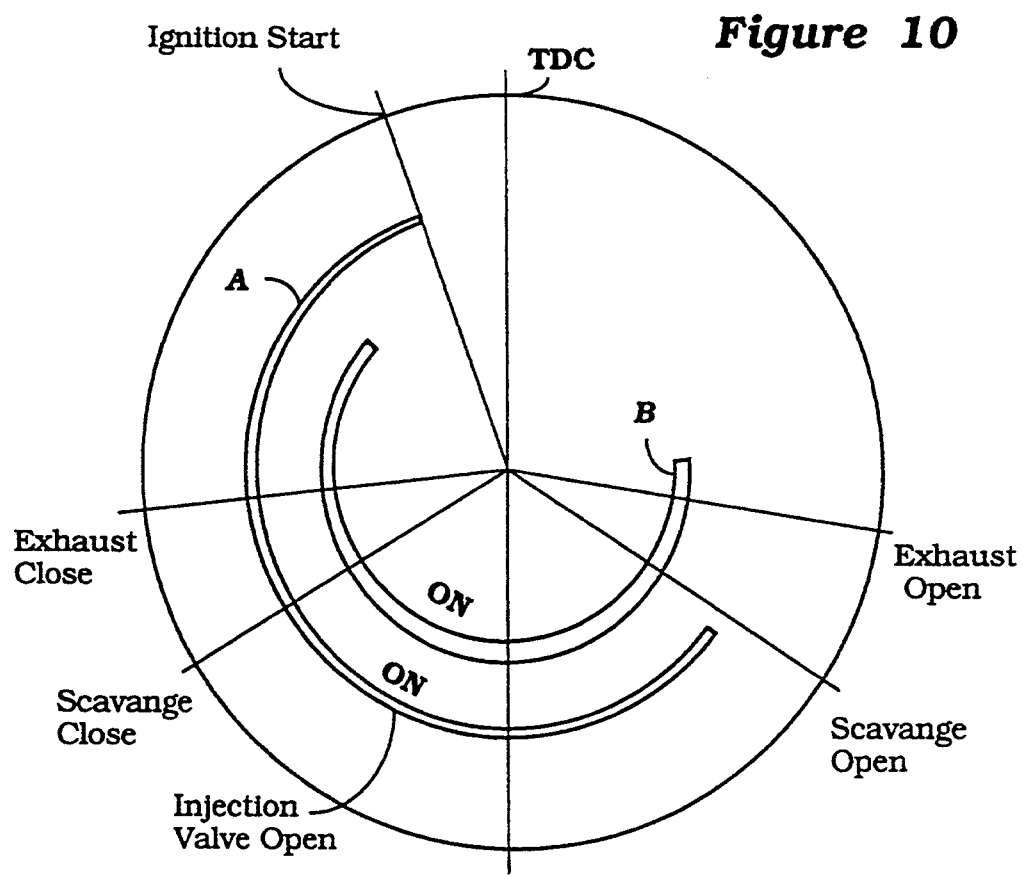
FIG. 10 is a timing diagram showing the operation under maximum speed and load.

As seen in FIG. 10, as the load and speed of the engine increases, the timing of injection can be advanced and also must be extended so as to provide adequate fuel. Two strategies are shown in this figure for wide open performance. The first strategy A still causes the ignition to occur at a time when the injector valve is open and does not begin injection too early so as to ensure that no fuel will be swept out of the exhaust port. The other curve, curve B, maintains the injection valve open for the same duration but advances the timing of injection. With this embodiment, some fuel may actually pass out of the exhaust port but this amount will be minimal.

Figure 12:
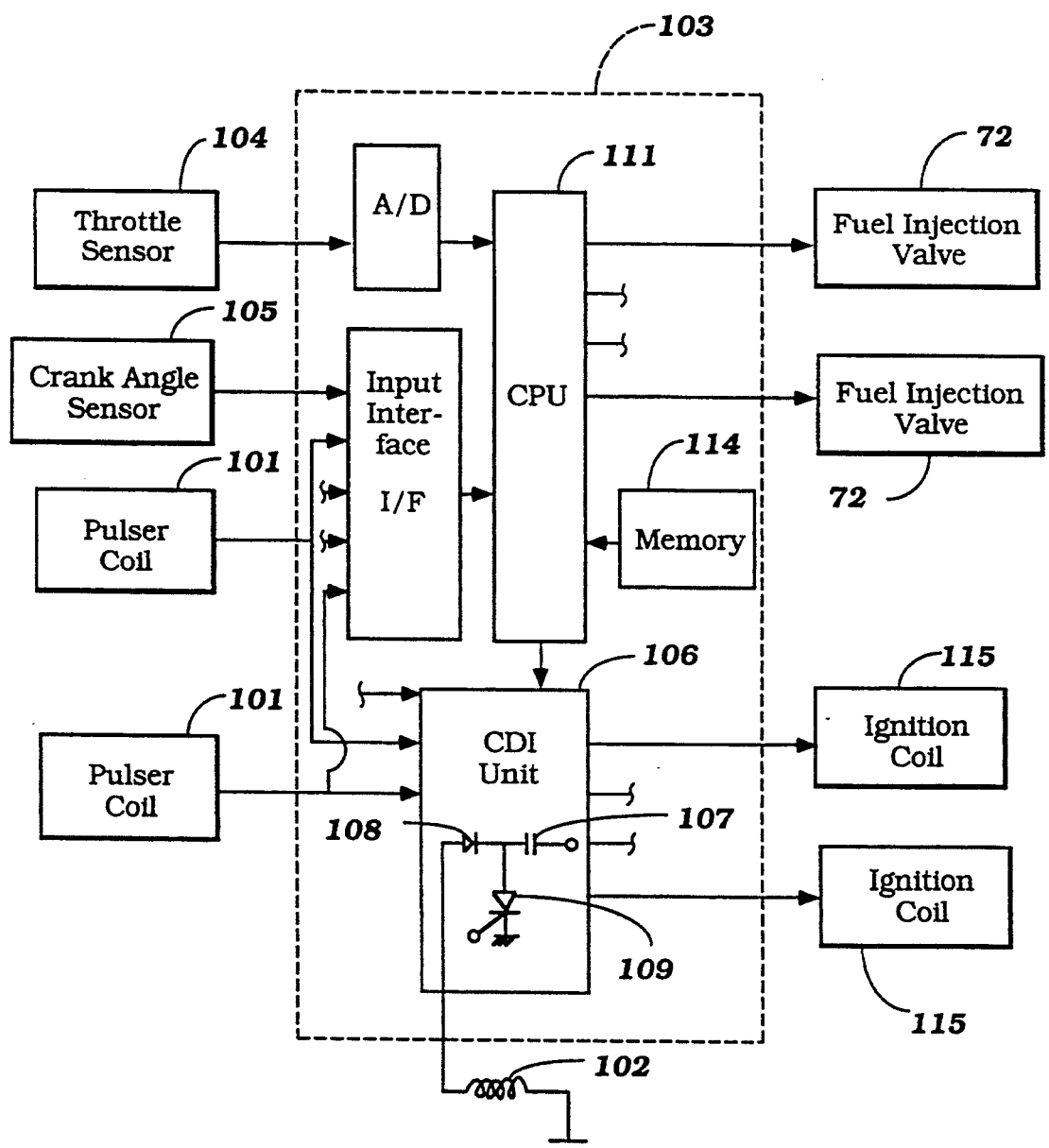
FIG. 12 is a schematic diagram showing the various components of the control system.

The control system for the fuel injection valves 72 and the spark plugs is shown in FIG. 12 in block form and will now be described by particular reference to that figure.

The ignition system for the spark coils includes a conventional type of magneto generator CDI unit that is comprised of pulsers coil 101 and a charging coil 102. These coils supply their signals and outputs to a control unit, indicated generally by the reference numeral 103. In addition, certain engine parameters and ambient parameters may be sensed and these include throttle valve position as sensed by a throttle position sensor 104 and crankshaft angle as sensed by a crankshaft angle sensor 105. In addition to these sensors, various other types of sensors of ambient conditions or engine running conditions may be supplied to the control unit 103 for controlling not only the firing of the spark plugs 93, but also the opening and closing of the injector valves 72.

As has been noted, the ignition system includes a capacitor discharge (CDI unit) which is indicated generally by the reference numeral 106, and which includes a charging capacitor 107 that is charged from the output of the charging coil 102 through a diode 108. FIG. 11 shows the voltage generated on the charging capacitor during the cycle of operation. Firing of the spark plugs is initiated by discharging the capacitor 107 through an SCR 109 which is controlled by a CPU 111 of the control unit 103.

The throttle positions sensor 104, which is an analog device, outputs its signal to an analog digital converter 112 which then outputs a digital signal indicative of throttle position to the CPU 111. The crank angle sensor 105 and pulser coils 101 output signals to an input interface circuit 113 which transmits the signals indicative of these conditions to the CPU 111. There is provided a map in a memory 114 that gives the desired fuel injection timing and spark timing for the sensed conditions and which controls the CDI unit 106 by switching the SCR 109 and also the fuel injector valves 72 by energizing or deenergizing their respective windings.

The capacitor 107, when discharged, generates a voltage in ignition coils 115 associated with each of the spark plugs 93 and fires them in a well known manner.

It should be apparent from the foregoing description that the described arrangement is very effective in insuring that good fuel economy and good combustion efficiency can be achieved, even under the extremely difficult low load, low speed conditions. Of course, the foregoing is that of a description of preferred embodiments of the invention and various changes and modifications may be made without departing from the spirit and scope of the invention, as defined by the appended claims.

We claim:

1. A direct injected internal combustion engine having a pair of relatively movable components defining a variable volume combustion chamber having a circular cross section, a fuel injection nozzle mounted within one of said components and disposed so that fuel issuing therefrom will be directed toward the other component as said components approach said minimum volume condition, a spark plug having its gap disposed in said variable volume chamber, means for initiating injection of fuel as said components approach said minimum volume condition under low speed, low load conditions, and means for firing said spark plug, said fuel injection nozzle having a spray port diameter in the ratio of 0.0035 to 0.0065 to the combustion chamber diameter.

2. A direct injected internal combustion engine as set forth in claim 1 wherein the other component is formed with a recessed area with a projection extending generally centrally into said recessed area and onto which the fuel is sprayed by the fuel injection nozzle.

3. A direct injected internal combustion engine as set forth in claim 2 wherein the fuel injection nozzle has an injection port with a length to diameter ratio in the range of 3 to 4.

4. A direct injected internal combustion engine as set forth in claim 3 wherein the projection has a diameter that is approximately one fifth of the diameter of the combustion chamber.

5. A direct injected internal combustion engine as set forth in claim 4 wherein the distance from the injection port to the top of the projection equals L and the following relationship exists:

$$(2 \cdot L \cdot \tan(\theta/2) + d) \div D_1 \leq 2$$

wherein $\theta$ is the spray angle from the injection port, d is the diameter of the injection port, and $D_1$ is the diameter of the projection.

6. A direct injected internal combustion engine as set forth in claim 2 wherein the projection has a diameter that is approximately one fifth of the diameter of the combustion chamber.

7. A direct injected internal combustion engine as set forth in claim 2 wherein the distance from the injection port to the top of the projection equals L and the following relationship exists:

$$(2 \cdot L \cdot \tan(\theta/2) + d) \div D_1 \leq 2$$

wherein $\theta$ is the spray angle from the injection port d is the diameter of the injection port and $D_1$ is the diameter of the projection.

8. A direct injected internal combustion engine as set forth in claim 1 further including porting means formed in the other of the components for admitting a charge to the chamber and for exhausting a charge from the chamber.

9. A direct injected internal combustion engine as set forth in claim 8 wherein the engine operates on a two-cycle principle.

10. A direct injected internal combustion engine as set forth in claim 9 wherein the duration of firing of the spark plug is extended so as to terminate after the fuel injection is terminated.

11. A direct injected internal combustion engine as set forth in claim 2 wherein the engine is a reciprocating engine and the other component comprises a piston and one of the components comprises a cylinder block, cylinder head assembly.

12. A direct injected internal combustion engine as set forth in claim 11 wherein the component defining the recessed area comprises the piston and the other component comprises the cylinder head, cylinder block assembly.

13. A direct injected internal combustion engine as set forth in claim 12 wherein the fuel injection nozzle has an injection port with a length to diameter ratio in the range of 3 to 4.

14. A direct injected internal combustion engine as set forth in claim 13 wherein the projection has a diameter that is approximately one fifth of the diameter of the combustion chamber.

15. A direct injected internal combustion engine as set forth in claim 14 wherein the distance from the injection port to the top of the projection equals L and the following relationship exists:

$$(2 \cdot L \cdot \tan(\theta/2) + d) \div D_1 \leq 2$$

wherein $\theta$ is the spray angle from the injection port d is the diameter of the injection port and $D_1$ is the diameter of the projection.

16. A direct injected internal combustion engine as set forth in claim 12 wherein the projection has a diameter that is approximately one fifth of the diameter of the combustion chamber.

17. A direct injected internal combustion engine as set forth in claim 12 wherein the distance from the injection port to the top of the projection equals L and the following relationship exists:

$$(2 \cdot L \cdot \tan(\theta/2) + d) \div D_1 \leq 2$$

wherein $\theta$ is the spray angle from the injection port d is the diameter of the injection port and $D_1$ is the diameter of the projection.

18. A direct injected internal combustion engine as set forth in claim 12 further including scavenge port means in the cylinder block for admitting a charge to the chamber and exhaust port means in the cylinder block for discharging a burnt charge.

19. A direct injected internal combustion engine as set forth in claim 18 wherein the projection lies between a pair of planes extending between the side edges of a scavenge port and an exhaust port.

20. A direct injected internal combustion engine as set forth in claim 19 wherein the scavenge port means further includes a pair of scavenge ports disposed on opposite sides of the scavenge port and toward the exhaust port.

21. A direct injected internal combustion engine as set forth in claim 19 wherein the spark plug is also positioned between the planes.

22. A direct injected internal combustion engine as set forth in claim 21 wherein the spark plug is positioned closer to the exhaust port than the projection.

23. A direct injected internal combustion engine as set forth in claim 19 wherein the fuel injection nozzle is disposed between the planes.

24. A direct injected internal combustion engine as set forth in claim 23 wherein the spark plug is also positioned between the planes.

25. A direct injected internal combustion engine as set forth in claim 24 wherein the scavenge port means further includes a pair of scavenge ports disposed on opposite sides of the scavenge port and toward the exhaust port.

* * * * *